United States Patent
Langford et al.

(10) Patent No.: US 10,130,832 B2
(45) Date of Patent: Nov. 20, 2018

(54) AUTOMATIC SWITCHABLE EXHALE CARTRIDGE

(71) Applicant: Scott Health & Safety Limited, Lancashire (GB)

(72) Inventors: Graham Langford, Wirral Merseyside (GB); Noel Toogood, Bristol (GB)

(73) Assignee: Scott Health & Safety Ltd.

( * ) Notice: Subject to any disclaimer, the term of this patent is extended or adjusted under 35 U.S.C. 154(b) by 488 days.

(21) Appl. No.: 14/854,345

(22) Filed: Sep. 15, 2015

(65) Prior Publication Data

US 2016/0001105 A1 Jan. 7, 2016

Related U.S. Application Data

(63) Continuation of application No. PCT/GB2014/050777, filed on Mar. 14, 2014.
(Continued)

(30) Foreign Application Priority Data

Jun. 3, 2013 (GB) .................................. 1309931.2

(51) Int. Cl.
*A62B 9/02* (2006.01)
*A62B 18/10* (2006.01)
(Continued)

(52) U.S. Cl.
CPC ................ *A62B 9/02* (2013.01); *A62B 18/10* (2013.01); *F16K 11/02* (2013.01); *F16K 15/025* (2013.01);
(Continued)

(58) Field of Classification Search
CPC .. A61M 16/20; A61M 16/201; A61M 16/208; A61M 16/209; A62B 9/02;
(Continued)

(56) References Cited

U.S. PATENT DOCUMENTS

| | | | |
|---|---|---|---|
| 2,406,888 | A | 9/1946 | Meidenbauer, Jr. |
| 2,985,169 | A | 5/1961 | Elling |

(Continued)

FOREIGN PATENT DOCUMENTS

WO    2010/131031 A2    11/2010

OTHER PUBLICATIONS

International Preliminary Report on Patentability and Written Opinion of the International Searching Authority dated Sep. 22, 2014 for International Application Serial No. PCT/GB2014/050777, International Filing Date Mar. 14, 2014, consisting of 8-pages.

(Continued)

*Primary Examiner* — Steven Douglas

(57) ABSTRACT

An exhale valve assembly includes a housing, a valve carrier body, a primary valve assembly, a plunger, a lock assembly, and an air pressure activated actuator assembly. The valve carrier body is disposed the housing and has a passageway. The primary valve assembly is mounted to the valve carrier body. A first air flow path passes through the passageway and a second air flow path passes through the primary valve assembly. The plunger is configured to permit a flow through the first air flow path when the plunger is in a first position and to direct a flow through the second air flow path when the plunger is in a second position. The lock assembly is configured to secure the plunger in the first position. The air pressure activated actuator assembly is configured to release the lock responsive to a pressure change within the cavity of the housing.

15 Claims, 4 Drawing Sheets

Related U.S. Application Data

(60) Provisional application No. 61/793,780, filed on Mar. 15, 2013.

(51) Int. Cl.

| | | |
|---|---|---|
| *F16K 11/02* | (2006.01) | |
| *F16K 15/02* | (2006.01) | |
| *F16K 31/12* | (2006.01) | |
| *A62B 7/00* | (2006.01) | |
| *A62B 7/02* | (2006.01) | |
| *A62B 7/04* | (2006.01) | |
| *A62B 18/00* | (2006.01) | |
| *A62B 18/04* | (2006.01) | |

(52) U.S. Cl.
CPC ............... *F16K 31/12* (2013.01); *A62B 7/00* (2013.01); *A62B 7/02* (2013.01); *A62B 7/04* (2013.01); *A62B 18/006* (2013.01); *A62B 18/045* (2013.01)

(58) Field of Classification Search
CPC ......... A62B 18/10; A62B 18/045; A62B 7/04; A62B 7/02; A62B 7/00; A62B 18/006; F16K 31/12; F16K 15/025; F16K 11/02
See application file for complete search history.

(56) References Cited

U.S. PATENT DOCUMENTS

| | | | |
|---|---|---|---|
| 5,685,296 A | * | 11/1997 | Zdrojkowski ......... A61M 16/20 |
| | | | 128/204.18 |
| 2008/0257352 A1 | | 10/2008 | Penton et al. |
| 2010/0236554 A1 | | 9/2010 | Prete |
| 2017/0137097 A9 | * | 5/2017 | Anderson ............. B63C 11/202 |

OTHER PUBLICATIONS

International Search Report dated Sep. 22, 2014 for International Application Serial No. PCT/GB2014/050777, International Filing Date Mar. 14, 2014, consisting of 4-pages.

\* cited by examiner

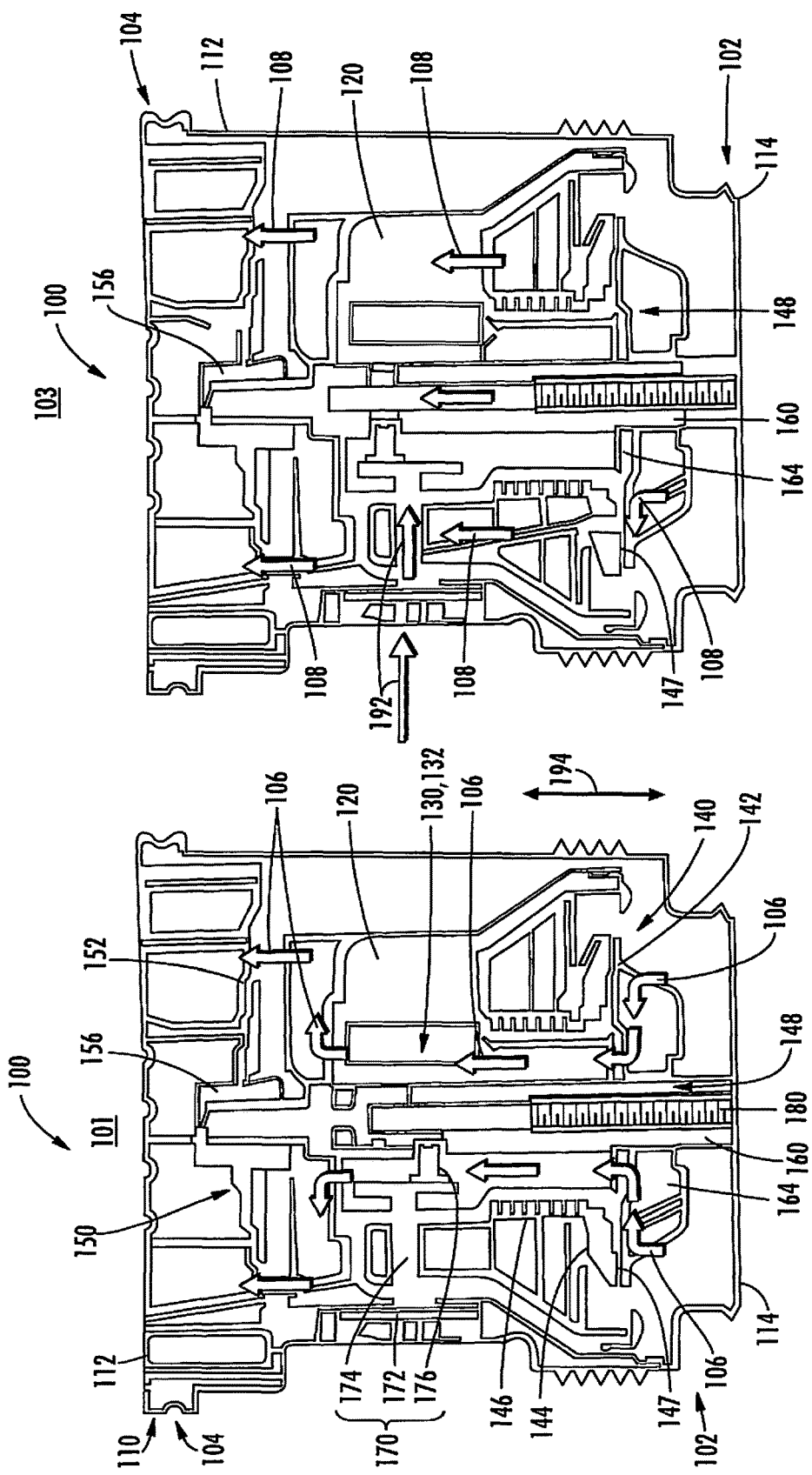

AUTOMATIC SWITCHABLE EXHALE CARTRIDGE

CROSS-REFERENCE TO RELATED APPLICATIONS

This application is a continuation of International Patent Application No. PCT/GB2014/050777 filed Mar. 14, 2014, which claims the benefit of and priority to U.S. Provisional Application No. 61/793,780 filed Mar. 15, 2013, and Great Britain Provisional Application No. 1309931.2 filed Jun. 3, 2013, the contents of each of which are incorporated herein by reference.

The subject matter described herein relates generally to exhale systems for respirators, and particularly to systems that are switchable between modes of operation.

BACKGROUND OF THE DISCLOSURE

Conventional respirator assemblies may utilize a mask or face piece configured to fit over the head of a user and/or be worn by a user. Respirator assemblies may include an inlet or inhale port or fitting configured to allow air for breathing into the mask, and an outlet or exhale port configured to allow air to be exhaled from the mask. Exhale assemblies may be used to allow exhaled air out of the mask, while preventing or inhibiting the flow of air from a surrounding environment that has not been filtered to enter the mask via the exhale port and respirator assembly. Respirator assemblies may be configured to operate in a variety of modes, with a different type of air supply being provided to the mask in the different modes.

Various air supply systems may be configured for positive pressure operation, wherein a positive pressure (e.g., a pressure provided by air supplied from a tank) is maintained inside the confines of a mask, hood, or the like worn by a user. Other air supply systems may be configured for negative pressure operation, where a positive pressure is not maintained inside the mask and air is drawn from the outside by the unaided breathing of a user creating a negative pressure (relative to atmospheric pressure) within the mask. However, a single respirator assembly may not be appropriate for operation in both positive pressure and negative pressure modes of operation. For example, an exhale system configured to maintain positive pressure within the mask may be difficult to overcome by the unaided breath of a user using the system in a negative pressure mode of operation. As another example, an exhale system configured to be used in a negative pressure mode of operation (e.g., providing a resistance to exhaled air readily overcome by the unaided breath of a user) may allow for leakage from a positive pressure system. Modifying certain conventional exhale assemblies from configuration for one mode of operation (e.g., negative pressure operation) to a different mode of operation (e.g., positive pressure operation) may be complicated and not practically or reliably performed in the field.

Thus, under certain conventional approaches, if users are required to use both negative and positive pressure operation, the users may be required to carry both types of equipment on their attire. Switching from one mode to a different mode would then require a user to remove one respirator and replace with another. Such a switch may take place in a contaminated or otherwise hazardous embodiment, rendering the user vulnerable to environmental or other hazards.

Conventional switchable exhale systems also suffer from drawbacks. For example, conventional switchable exhale systems require the user to manually switch a system from negative pressure mode operation to positive pressure mode operation. In some conventional systems, a manual rotation motion may be utilized to apply a bias to a negative pressure exhale valve or by moving a biased exhaled valve onto a valve seat. Such systems rely on the user to remember to switch between the two modes. However, if the user somehow fails to switch from negative pressure operation to positive pressure operation, excess air will escape via the exhale system, depleting the air supply of the positive pressure supply system. The depletion of air may not be audible to the user, especially in a loud environment. Such manual rotational switching mechanisms may be difficult to locate and/or be difficult to manipulate by a user wearing gloves, for example.

SUMMARY OF THE DISCLOSURE

In various embodiments, an exhale valve assembly is provided including a housing, a valve carrier body, a primary valve assembly, a plunger, a lock assembly, and an air pressure activated actuator assembly. The exhale valve assembly is configured to be operably connected to a mask and has an inlet end configured to accept exhaled air and an outlet end configured for egress of accepted exhaled air from the exhale valve assembly. The housing has a cavity disposed therein. The valve carrier body is disposed in the cavity and has a passageway extending along a length of the valve carrier body. The primary valve assembly includes a primary valve having a body and an opening. The primary valve is mounted to the valve carrier body with the opening disposed circumferentially around the valve carrier body, wherein a first air flow path passes through the passageway of the valve carrier body and a second air flow path passes through the primary valve assembly. The plunger is disposed at least partially within the valve carrier body and movable between a first position and a second position. The plunger includes a blocking plate configured to permit the exhaled air through the first air flow path when the plunger is in the first position and to direct the exhaled air through the second air flow path when the plunger is in the second position. The lock assembly is operably connected to the plunger and is configured to secure the plunger in the first position. The air pressure activated actuator assembly is disposed within the cavity and includes a pressure sensitive member biasable in a pressure actuation direction responsive to a pressure change in the cavity. The air pressure activated actuator assembly is operably connected to the lock assembly and configured to release the lock responsive to a pressure change within the cavity of the housing.

In various embodiments, an exhale valve assembly including a housing, a valve carrier body, a primary valve, a secondary valve, a plunger, a lock assembly, and an air pressure activated actuator assembly is provided. The exhale valve assembly has an inlet end configured to accept exhaled air and an outlet end configured for egress of accepted exhaled air from the exhale valve assembly. The housing has a cavity disposed therein. The valve carrier body is disposed in the cavity and has a central passageway extending along a length of the valve carrier body. The central passageway has an opening proximate the inlet end. The primary valve assembly includes a primary valve having a body and a central opening. The primary valve is mounted to the valve carrier body proximate the opening of the central passageway, with the central opening of the primary valve disposed circumferentially around the valve carrier body. A first air flow path passes through the central passageway of the valve carrier body and a second air flow path passes through the primary valve assembly. The secondary valve is disposed in the cavity proximate the outlet end, and is configured to inhibit the entry of air from a surrounding atmosphere via the outlet end. The plunger is disposed at least partially within the valve carrier body and is movable between a first position and a second position along an actuation direction oriented along a length of the housing. The plunger includes a blocking plate. The blocking plate is positioned a distance away from the opening of the central passageway of the valve carrier body when the plunger is in the first position and is positioned covering the opening of the central passageway of the valve carrier body when the plunger is in the second position. The exhaled air is inhibited from entering the central passageway and is directed through the second air flow path when the plunger is in the second position. The lock assembly is operably connected to the plunger and configured to secure the plunger in the first position. The air pressure activated actuator assembly is disposed within the cavity and includes a pressure sensitive member biasable in a pressure actuation direction responsive to a pressure change in the cavity. The air pressure activated actuator assembly is operably connected to the lock assembly and configured to release the lock assembly responsive to a pressure change within the cavity of the housing.

In various embodiments, a respirator assembly including a mask, and an exhale valve assembly is provided. The mask includes first and second inhale ports and an exhale port. The first and second inhale ports are configured to accept an air supply from first and second air supply systems, respectively. The exhale port is configured for passage of exhaled air from the mask. The exhale valve assembly is operably connected to the mask via the exhale port, and has an inlet end configured to accept the exhaled air and an outlet end configured for egress of the exhaled air from the exhale valve assembly. The exhale valve assembly includes a housing, a valve carrier body, a primary valve assembly, a plunger, a lock assembly, and an air pressure activated actuator assembly. The housing has a cavity disposed therein. The valve carrier body is disposed in the cavity and has a passageway extending along a length of the valve carrier body. The primary valve assembly includes a primary valve having a body and an opening. The primary valve is mounted to the valve carrier body with the opening disposed circumferentially around the valve carrier body, wherein a first air flow path passes through the passageway of the valve carrier body and a second air flow path passes through the primary valve assembly. The plunger is disposed at least partially within the valve carrier body and movable between a first position and a second position. The plunger includes a blocking plate configured to permit the exhaled air through the first air flow path when the plunger is in the first position and to direct the exhaled air through the second air flow path when the plunger is in the second position. The lock assembly is operably connected to the plunger and is configured to secure the plunger in the first position. The air pressure activated actuator assembly is disposed within the cavity and includes a pressure sensitive member biasable in a pressure actuation direction responsive to a pressure change in the cavity. The air pressure activated actuator assembly is operably connected to the lock assembly and configured to release the lock responsive to a pressure change within the cavity of the housing.

BRIEF DESCRIPTION OF THE DRAWINGS

The drawings, in which like numerals represent similar parts, illustrate generally, by way of example, but not by way of limitation, various embodiments discussed in the present document.

FIG. 1 is a side sectional view of an exhale system formed in accordance with various embodiments in a first position for operation in a first mode of operation.

FIG. 2 is a side sectional view of the exhale system of FIG. 1 in a second position for operation in a second mode of operation.

DETAILED DESCRIPTION OF THE DISCLOSURE

Figure 3:
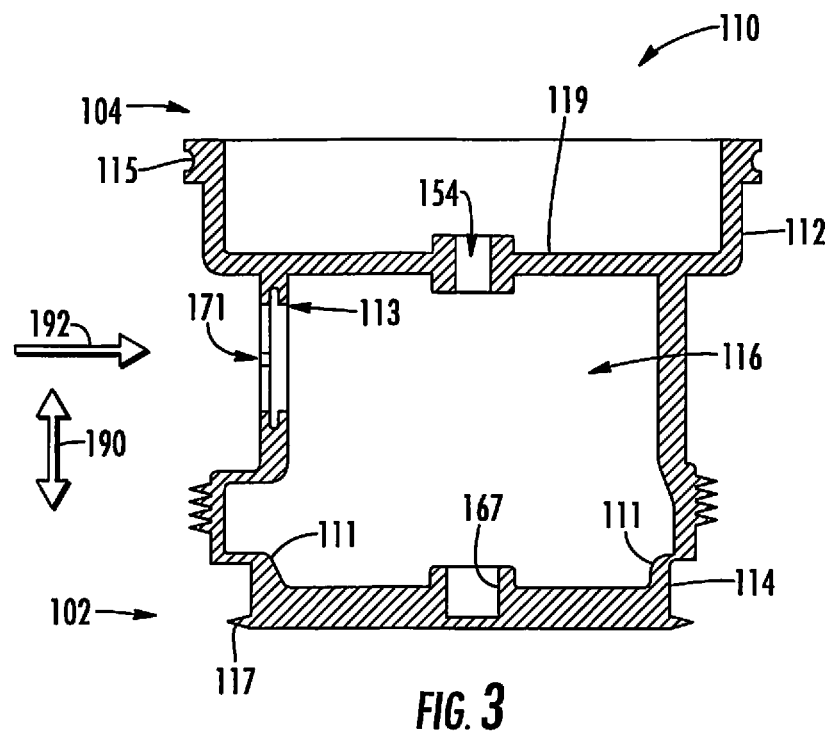
FIG. 3 is a side sectional view of a housing formed in accordance with various embodiments.

Generally, in various embodiments, an exhalation system configured to be switchable between two or more modes of operation is provided. For example, an exhalation system may be switchable between first and second configurations or positions, with the first configuration or position corresponding to negative pressure operation and the second configuration or position corresponding to positive pressure operation. In some embodiments, the second configuration may provide a relatively higher resistance to air flow to help maintain positive pressure in a mask, while the first configuration may provide a relatively lower resistance to air flow to allow for lower exhalation effort from a user, while still preventing ingress into the exhale system from the atmosphere.

In various embodiments, a removable exhale system (e.g., configured for releasable securement and re-attachment to a mask, face piece, or the like) is provided that provides two distinct modes of operation that may be switched between. Switching between a first and second mode of operation may be achieved automatically and/or in a contactless or hands-free manner. For example, the switch from a first to a second mode of operation may be achieved in a contactless or hands-free manner by the use of a negative pressure or pressure drop provided by an inhalation of a user that exceeds a threshold pressure. As another example, the switch from a first to a second mode of operation may be achieved automatically by the use of a common pressure signal (e.g., an inhalation exceeding a threshold negative pressure or pressure drop within the exhale system) to switch the mode of operation of an exhale system as well as to switch an air supply or to initiate supply from an air tank. Thus, no additional activity (in addition to providing a pressure signal to change the air supply) is required to be performed by a user to switch operating modes of the exhale system. The mode of operation of the exhale system is thus automatically switched when the air supply is switched. Because the switch of modes of operation is automatic, the user need not remember to perform a separate task (e.g., rotating an actuator) to switch the mode of operation of the exhale system. In some embodiments, the switch from a first mode of operation may be performed automatically whereas the switch from the second mode of operation to the first mode of operation may be performed manually. Further, a manual switching capability for switching from the first mode to the second mode may be provided as a back-up to the automatic switching.

For example, in some situations (e.g., Chemical, Biological, Radiological, and Nuclear (CBRN) defense applications), a wearer or user of a respirator assembly may be required to utilize a Self-Contained Breathing Apparatus (SCBA) during all or a portion of an operation. At one or more points before, during, or after an operation, the user may desire to switch from SCBA or positive pressure operation to a negative pressure operation, such as use of an Air Purifying Filter (APR), for example to preserve air from a supply tank during portions of a mission that do not require the use of the SCBA, or, as another example, during decontamination or cleaning following a mission. Similarly a user may desire to switch from APR or negative pressure operation to SCBA or positive pressure operation. Various embodiments provide for convenient switching between modes of operation, such as between positive and negative pressure modes of operation.

Thus, in various embodiments, a first mode of exhale system operation may correspond to use of a negative pressure air supply, such as APR. In the first mode, the exhale system may be configured to provide adequate protection from ingress into a mask or respirator via the exhale system from the surrounding environment, while maintaining an exhalation resistance as low as possible or practical for a user. In the second mode, the exhale system may be configured to provide a biased exhalation resistance to maintain a positive pressure within the mask or respirator.

For example, SCBA systems may include a "first breath" mechanism (e.g., a "first breath" mechanism disposed within a demand valve) that activates the SCBA system. In systems with a "first breath" mechanism, a user, by drawing in enough air to exceed a threshold pressure (e.g., by providing a relatively sharp, deep, or strong inhalation activity that provides a greater negative pressure or pressure drop than a normal inhalation), may trigger the "first breath" mechanism to activate the SCBA system, or switch from a negative pressure air supply (e.g., APR) to a positive pressure air supply (e.g., SCBA). The exhale system in various embodiments may be configured so that the same pressure drop or pressure signal (or a corresponding pressure drop or pressure signal) used to trigger the SCBA "first breath" mechanism also switches the exhale system from negative pressure operation to positive pressure operation. It may be noted that some positive pressure air supply systems may not include a "first breath" mechanism. For example, powered APR (PAPR) systems may not include a demand valve or "first breath" mechanism. Additionally or alternatively, for positive pressure systems that do not employ a first breath mechanism, an additional manual switching mechanism (e.g., a button or lever) may be provided for switching from negative pressure to positive pressure operations.

Various embodiments provide a user with the ability to switch an exhale system automatically from negative pressure operation to positive pressure operation within the same respirator (e.g, mask), while wearing the respirator, and thus avoiding any sudden loss of protection or discontinuity in protection. For example, two air supply systems (e.g., APR and SCBA) may be directly connected to the respirator via respective inlet ports. To change from APR operation to SCBA operation, as mentioned above, a user may generate enough negative pressure inside the respirator to trigger or invoke a "first breath" mechanism on a SCBA demand valve and switch to SCBA air supply. The same negative pressure may be utilized to change the exhale system from negative to positive pressure operation. Thus, an inhalation signal may be employed to switch to positive pressure air supply (e.g., activate use of a supply tank), and the same (or corresponding) inhalation signal may be used to switch the exhale system from negative pressure operation to positive pressure operation. To switch from SCBA operation to APR operation, the user may reset the "first breath" mechanism on the SCBA demand valve to switch the air supply, and manually reset the exhale system for APR operation. If a user forgets to manually reset the exhale system for APR operation, inconvenience from increased exhalation pressure (due to the higher exhalation resistance of the positive pressure mode of operation of the exhale system) may be experienced, but safety hazards may still be avoided.

Thus various embodiments provide an exhale system that is switchable between modes of operation. A technical effect of various embodiments includes improved convenience in switching between configurations of exhale systems for different modes or types of operation. A technical effect of various embodiments includes reduction in the ingress of air or potential contaminants into a mask during switching of modes or types of operation. A technical effect of various embodiments includes improved convenience and reliability in the switching and operation of exhale configurations for respirator systems. A technical effect of various embodiments includes provision of automatic (e.g., without requiring an additional specifically targeted act by a user or operator) switching from a negative pressure mode of operation to a positive pressure mode of operation. For example, the exhale system may switch from a first mode of operation to a second mode of operation via a shared inhalation signal, such that the exhale system automatically switches to the second mode of operation if the air supply is switched to a corresponding air supply.

FIG. 1 and FIG. 2 provide side sectional views of an exhale valve assembly 100 formed in accordance with various embodiments. The exhale valve assembly 100 includes an inlet end 102 configured to be operably connected to a mask and an outlet end 104 disposed opposite the inlet end 102. The exhale valve assembly 100 is configured to accept exhaled air from the mask at the inlet end 102 and to allow the exhaled air to pass out of the exhale valve assembly 100 at the outlet end 104. The exhale valve assembly 100 is further configured to prevent the ingress of air into the mask via the exhale valve assembly 100 from a surrounding atmosphere or environment.

FIG. 1 depicts the exhale valve assembly 100 in a first configuration for a first mode of operation, and FIG. 2 depicts the exhale valve assembly in a second configuration for a second mode of operation. In the first configuration, the exhale valve assembly 100 is configured for negative pressure operation (e.g., APR operation), and exhaled air is directed along a first pathway 106. In the second configuration, the exhale valve assembly 100 is configured for positive pressure operation (e.g., SCBA operation), and exhaled air is directed along a second pathway 108.

The depicted exhale valve assembly 100 includes a housing 110, valve carrier body 120, a latch 130, a primary valve assembly 140 (including a primary valve 142), a secondary valve 150, a plunger 160 (including a blocking plate 164), an air pressure activated actuator assembly 170, and a plunger spring 180. In the illustrated embodiment, the air pressure activated actuator assembly 170 includes a diaphragm 172, an activation pin 174, and a saddle 176. The housing 110 is configured to secure and maintain the various components of the exhale valve assembly 100 in a desired relationship (or relationships) to each other. The depicted valve carrier body 120 provides guidance and support to the primary valve assembly 140 as well as the plunger 160. Also, the valve carrier body 120 includes a passageway therethrough configured to allow air flowing along the first pathway 106 to bypass the primary valve assembly 140. The primary valve assembly 140 is configured to provide a biased resistance to exhaled air entering the exhale valve assembly 100, and thus to maintain a positive pressure with a mask during positive pressure operation.

The plunger 160 is configured to be movable between a first position 101 in the first configuration for negative pressure operation (FIG. 1) and a second position 103 in the second configuration for positive pressure operation (FIG. 2), and thereby to direct exhaled air along the first pathway 106 and the second pathway 108, respectively. With the plunger 160 in the first position 101, an opening through a central passageway of the valve carrier body 120 is accessible to the exhaled air flow, and the exhaled air flows along the first pathway 106, bypassing the primary valve assembly 140. With the plunger 160 in the second position 103, the opening through the central passageway of the valve carrier body 120 is blocked, directing the exhaled air along the second pathway 108, requiring the exhaled air to bias the primary valve assembly 140 open and flow through the primary valve assembly 140. Thus, the second configuration (with the plunger 160 in the second position 103), provides a greater exhalation resistance than the first configuration, and may be utilized to maintain a positive pressure in a mask. The plunger 160 in the illustrated embodiment moves in a first actuation direction 190 that is generally along a central axis passing along the length of the housing 110 (e.g., between the inlet end 102 and the outlet end 104).

Generally, the primary valve assembly 140 is configured to limit or control flow from the mask through the exhale valve assembly 100, while the secondary valve 150 is configured to prevent ingress into the exhale valve assembly from the environment or surrounding atmosphere while allowing air to flow out of the outlet end 104. In FIGS. 1 and 2, the primary valve assembly 140 is shown biased against a seat (e.g., a seat or support surface) formed on the housing 110), but may be biased upward (e.g., away from the inlet end 102) by an exhalation force. Thus, the secondary valve 150 is used in both positions or along both pathways, while the primary valve assembly 140 may be bypassed in the first position 101 or along the first pathway 106. Thus, the exhale valve assembly 100 is configured to provide adequate protection against ingress from the environment or surroundings in either of the first position 101 or the second position 103, while sustaining an exhalation resistance as low as possible or practical in the first position 101 (e.g, via bypassing the primary valve assembly 140), and providing a sufficient exhalation resistance to maintain a positive pressure (e.g., in a mask operably connected to the primary valve assembly 140) in the second position 103. The second position 103 provides a biased exhalation resistance (e.g., by directing the flow through the primary valve assembly 140) to maintain a positive pressure within the mask or respirator.

The latch 130 is configured to secure the plunger 160 in the first position 101 against a force provided by the plunger spring 180. The pressure activated actuator assembly 170 is configured to depress the latch 130 (or otherwise unlock a lock assembly) and release the plunger 130 responsive to a change in air pressure inside the housing 110 (e.g., a breath configured to trigger a "first breath" mechanism of a demand valve of a SCBA). With the latch 130 depressed and the plunger 160 released, the plunger spring 180 urges the plunger 160 from the first position 101 (FIG. 1) to the second position (FIG. 2). In the illustrated embodiment, the air pressure activated actuator assembly 170 is configured to move in a pressure actuation direction 192 that is substantially transverse to the first actuation direction 190 and a central axis passing along a length of the housing 110.

In an example scenario, the exhale valve assembly 100 begins in the first configuration (FIG. 1), with the plunger 160 in the first position 101 and the exhale valve assembly 100 configured for negative pressure operation, for example, operation in an APR mode. In the first position 101 or APR mode, the plunger 160 is spring loaded by the plunger spring 180, which is compressed when the plunger 160 is in the first position 101. The plunger 180 is maintained in the first position against the urging of the plunger spring 180 by the latch 130. In the first configuration, a user's exhaled breath travels along the first pathway 106, into the inlet end 102 of the exhale valve assembly 100, around the blocking plate 164 of the plunger 160, bypassing the primary valve assembly 140 through a central passage or central breathing zone through the valve carrier body 120, through the secondary valve 150, and out of the outlet end 104 to the atmosphere.

The exhale valve assembly 100 may be switched from the APR mode to a SCBA mode corresponding to the second configuration (with the plunger 160 in the second position 103 as seen in FIG. 2) via the creating of a negative pressure sufficient to activate the air pressure activated actuator assembly 170. For example, a user may take a sharp, deep, or strong inhalation (and may cover an APR filter attached to the mask with a hand at the same time). The inhalation thus reduces the pressure in the exhale valve assembly 100, drawing the diaphragm 172 inward (or along the pressure actuation direction 192). The deflection of the diaphragm 172 in turn urges the activation pin 172 along the pressure actuation direction 192, which in turn urges the saddle 174 along the pressure actuation direction 192. As the saddle 174 traverses in the pressure actuation direction 192, the saddle 174 presses against the latch 130, depressing the latch 130, and releasing the plunger 160. The force from the compressed plunger spring 180 than urges the plunger 160 to travel upwards (e.g., toward the outlet end 104) along the first actuation direction 190. The saddle 174 travels with the plunger 160, while the diaphragm 170 and the activation pin 172 do not. With the plunger 160 in the second position, the central passageway of the valve carrier 120 is blocked, and exhaled air is directed along the second pathway 108 through the primary valve assembly 140.

To reset or return the system to the first configuration, a force is applied to the center of the secondary valve 150. For example, a user may insert a finger into the outlet end 104 and press downward (e.g., toward the inlet end 102) on the center of the secondary valve 150. The center of the secondary valve 150 is then urged against the plunger 160, and the plunger 160 is urged to the first position 101 against the plunger spring 180. When the plunger 160 reaches the first position 101, the latch 130 resiliently moves into a locked position, securing the plunger 160 in the first position 101.

In various embodiments, a manual override function may be provided, allowing the user to manually switch between the first position 101 and the second position 103. For example, a rotational member operably connected to a push-button with a spring and a latch (generally similar to the operation of a retractable ballpoint pen) may be employed to provide a click on/click off manual override. It may be noted that, in some embodiments, the exhale valve assembly 100 may be provided in a kit form for retrofitting to pre-existing respirator systems.

It may be noted that, in the illustrated embodiment, the primary valve assembly 140 is configured to be maintained in the same general spatial arrangement with respect to the housing 110 (and valve carrier body 120), irrespective of mode or position. For example, a body of the primary valve assembly 140 may be biased upward by exhaled breath, but the seated position of the components of the primary valve assembly 140 is independent of the position of the plunger 160, and is the same for both the first and second configurations with respect to the housing 110 and the valve carrier 120. Thus, in the illustrated embodiment, the switch between configurations, pathways, or modes of operation is achieved via a motion of the plunger 180, not a movement of the primary valve 140. In alternate embodiments, a pressure activated actuator assembly may be operably connected to move the primary valve assembly 140 (or a portion thereof) to switch between pathways, configurations, or modes of operation.

The depicted housing 110 (see also FIG. 3) includes a housing body 112 joined to a seat 114. The seat 114 and the housing body 112 may be releasably secured to each other (e.g., via a thread, snap-fit connection, or the like) to provide convenient disassembly of the housing 110 for maintenance or replacement of components of the exhale valve assembly 100. The housing 110 may define a generally cylindrical shape. The housing 110 defines a cavity 116 that is open at the inlet end 102 and the outlet end 104 to allow passage of exhaled air through the housing 110. The passage of air through the opening of the cavity 116 at the outlet end 104 in the illustrated embodiment is controlled by secondary valve 150 to allow air out of the outlet end 104 but to prevent or inhibit the ingress of air via the outlet end 104. The housing 110 may be understood as having a length that extends upward or downward as shown in FIGS. 1-3. Thus, a length of the housing 110 may extend along a central axis through a generally cylindrical shape extending between the inlet end 102 and the outlet end 104.

The housing body 112 may include a diaphragm holder 113, a first sealing surface 115, a second sealing surface 117 (disposed on the seat 114 in the illustrated embodiment), and a secondary valve support 119 (web with center opening for clearance of plunger 160). One or more aspects of the housing body 112 may be formed integrally, while one or more aspects may be snapped, screwed, or otherwise joined to the housing body 112. The housing body 112 may be made from a generally rigid, lightweight material configured for use in CBRN applications, such as a nylon plastic.

The diaphragm holder 113 may include a locking ring, clip or otherwise releasably securable member. For example, the diaphragm 172 may be placed in a recess or counterbore into a side of the housing body 112, with a clip or locking ring used to secure the diaphragm 172 in place. The diaphragm 172 may be secured along edges of the diaphragm 172, with the center of the diaphragm 172 free to flex or bias in the pressure actuation direction 192 responsive to a reduction of pressure in the exhale valve assembly 100. The diaphragm holder 113 in various embodiments may include a clearance or opening 171 in the side of the housing body 112 or in the side of a locking ring (optionally with an associated button, lever, or the like) for access to the diaphragm 172, thereby allowing a user to manually urge the diaphragm 172 in the pressure actuation direction 192, as a manual override or backup to pressure induced activation of the press diaphragm for manual operation as a back-up to or override for air pressure activated actuator assembly 170.

The first sealing surface 115 is disposed circumferentially along an exterior surface of the housing body 112 proximate the outlet end 104, and is configured to accept an O-ring, gasket, or the like. The second sealing surface 117 is disposed circumferentially along an exterior surface of the housing seat 114 and is configured to accept an O-ring, gasket or the like. Thus, the housing 110 may be mounted in an air tight fashion, for example, to a mask or face piece and/or additional aspect of a respirator system. The secondary valve support 119 is configured to provide support and guidance to the secondary valve. For example, the secondary valve support 119 in the illustrated embodiment is disposed generally across a circular cross-section of the cavity 116, and configured to be positioned below the secondary valve 150. Thus, the secondary valve support 119 may prevent or inhibit the downward (e.g., toward the inlet end 102) movement of the secondary valve 150, preventing the ingress of air from the outlet end 104. The secondary valve support 119 may be configured with a central ring including a center opening 154 configured for clearance for the plunger 160, with spokes or other radial extensions extending outwardly to ring forming a web through which exhaled air may pass.

The depicted housing seat 114 is configured to cooperate with the housing body 112 to form the housing 110. The housing seat 114 may be releasably secured to the housing body 112. The housing seat 114 may be made from a generally rigid, lightweight material configured for use in CBRN applications, such as a nylon plastic. The housing seat 114 in the illustrated embodiment includes valve seat 111 and a plunger retainer 167. The valve seat 111 is disposed proximate the inlet end 102 and generally circumferentially disposed about an upper surface of the housing seat 114. The valve seat 111 provides a surface against which at least a portion of the primary valve assembly 140 may be seated in a sealing cooperation, for example, to maintain a positive pressure within a respirator assembly. The plunger retainer 167 in the illustrated embodiment is configured as a circular recess configured to accept the bottom of the plunger 160 and the plunger spring 180, and to guide and support the plunger 160 and plunger spring 180. The plunger retainer 167 also provides a surface against which the plunger spring 180 may be seated to exert a force against the plunger 160 to urge the plunger 160 toward the second position 103. The housing seat 114, like the secondary valve support 119, may be generally circular in cross section with spokes or radial extensions having openings therebetween to allow exhaled air to enter into the inlet end 102 of the exhale valve assembly 100. It should be noted that the depicted housing 110 is provided by way of example for illustrative purposes, and that variations in the particular arrangement or distribution of certain structures or aspects of the housing body 112 and housing seat 114 may be present in alternate embodiments.

Figure 4:
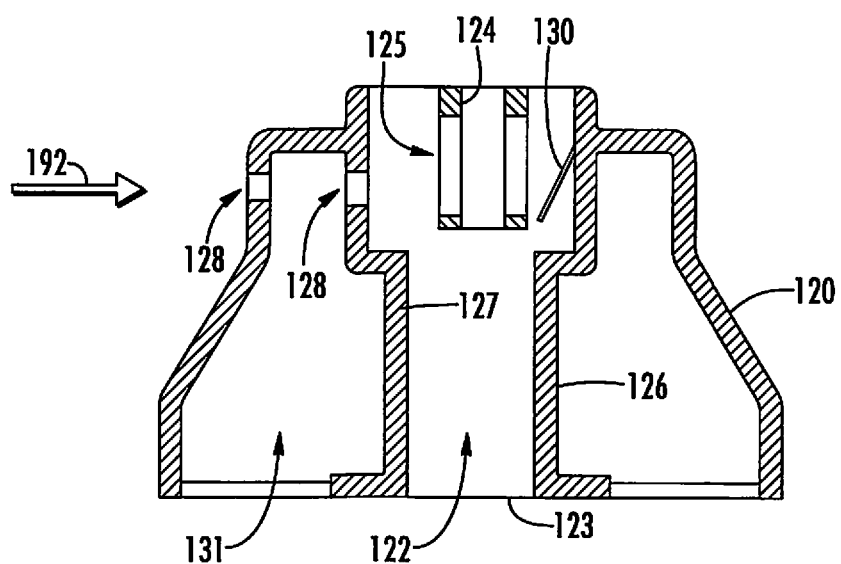
FIG. 4 is a side sectional view of carrier valve body formed in accordance with various embodiments.

The valve carrier 120 (see FIG. 4) is mounted to the housing 110 and is disposed within the cavity 116 of the housing 110. In the illustrated embodiment, the valve carrier 120 is mounted in a non-movable or fixed relationship to the housing 110. The depicted valve carrier 120 is configured to provide a mounting or carrying surface or surfaces for the primary valve assembly 140, to provide guidance and support to the plunger 180, to cooperate with the air activated pressure actuation assembly 170 to release and/or secure the plunger 160 in position, and to provide pathways for the passage of exhaled air from the inlet end 102 to the outlet end 104. In the illustrated embodiment, the valve carrier 120 is generally bell shaped with openings at a top (e.g., a surface proximate the outlet end 104) to allow passage of exhaled air out. The housing body also includes internal structures for directing the flow of air and/or guiding or supporting the plunger 160. In various embodiments, the valve carrier 120 may be made from a generally rigid, lightweight material configured for use in CBRN applications, such as a nylon plastic.

The depicted valve carrier 120 includes a central passageway 122 having an opening 123, a plunger guide 124, a spring surface 126, a pin opening 128, a latch 130, and an outer passageway 131. The central passageway 122 is configured for the passage of exhaled air when the plunger 160 is in the first position 101, and the outer passageway 131 is disposed radially outwardly about the central passageway and configured for passage of exhaled air when the plunger 160 is in the second position 103. In the illustrated embodiment, a portion of the plunger 160 (e.g., a blocking plate 164 of the plunger 160) is configured to cover or block the opening 123 of the central passageway 122 in the second position 103, and to be positioned a distance away from the opening 123 in the first position 101. The plunger 160 thus permits air flow into the central passageway 122 when in the first position 101, and prevents flow in the central passageway 122, directing exhaled air to the external passageway 131, when in the second position 103. It may be noted that the central passageway 122 need not necessarily include an axis passing through the center of the valve carrier 120. For example, the central passageway 122 may be centrally disposed in that the central passageway may be formed as a ring or annular shape disposed about a central axis. In still other embodiments, the central and outer passageways may be replaced by otherwise positioned passageways. In the illustrated embodiment, the central passageway 122 is disposed radially outward around the plunger guide 124. The central passageway 122 is bounded radially outwardly by a generally cylindrical wall 127, which also inwardly bounds the external passageway 131. An exterior portion of the wall 127 may also form at least a portion of the spring surface 127 in various embodiments.

The plunger guide 124 is a generally cylindrical structure centrally disposed and extending along at least a portion of the length of the valve carrier 120. The plunger guide 124 is configured to accept the plunger 160 within the interior of the plunger guide 124, and to guide and support the plunger 160 along the first actuation direction 190. The depicted plunger guide 124 includes a guide slot 125 sized and configured to provide clearance for the saddle 176 to join the plunger 160 and move with the plunger 160 in the actuation direction 190 between the first position 101 and the second position 103.

In the illustrated embodiment, the spring surface 126 of the valve carrier body 120 extends circumferentially along a portion of the wall 127 of the valve carrier 120 proximate the outlet end 102, and is configured for mounting, guidance, and support of the primary valve assembly 140. In the illustrated embodiment, the spring surface 126 provides an interior surface to support a valve spring and to guide and support a primary valve body during biasing of the primary valve body. The spring surface 126 allows one or more aspects of the primary valve assembly 140 to ride up (against the urging of a valve spring) to an open position, and down (with the urging of a valve spring) to a closed position. The spring surface 126 terminates in a shoulder configured to provide a seating surface for the valve spring 146 to push against.

In the illustrated embodiment, the latch 130 is operably connected to the valve carrier body 120 and is configured to releasably secure the plunger 160 in the first position. For example, in the illustrated embodiment, the latch 130 is a resilient member that may be accepted by a groove, slot, or other recess of the plunger 160 to secure the plunger 160 in the first position 160. The latch 130 may be biased in the pressure actuation direction 192 to exit the recess of the plunger 160 and release the plunger 160. The latch 130 may be integrally formed with other aspects of the valve carrier body 120 in some embodiments. In other embodiments, the latch 130 may be removably attached, for example mounted or secured to the valve carrier body 120 within a recess, slot, groove, or the like. It may be noted that the latch 130 cooperates with one or more grooves, slots, or recesses (e.g., latch opening 168 of the plunger 160, see below) to form a lock assembly 132. In alternate embodiments, the lock assembly 132 may be otherwise constituted, positioned, or configured.

The primary valve assembly 140 is configured to provide resistance to exhaled air or other air from the mask when the plunger 160 is in the second position 103 (e.g., the exhale valve assembly 103 is configured for positive pressure operation). The primary valve assembly 140 is configured to prevent the passage of air from a mask or respirator when the exhale valve assembly 100 is in the second configuration (FIG. 2) unless exhalation from a user is provided. The depicted primary valve assembly includes a primary valve 142, a cap 144, and a valve spring 146. Generally, the valve spring 146 is configured to be disposed about an upper portion of the spring surface 126 of the valve carrier body 120, and to bias the primary valve 142 toward a closed position. The valve spring 146 is sized and configured to prevent movement of the primary valve 142 when opposed only by a pressure corresponding to a positive pressure to be maintained in a mask, but to be biasable when opposed by exhalation in addition to the mask pressure. Thus the primary valve 142 is urged upward into an open position against valve spring 146 when the primary valve 142 is encountered by a pressure above a desired positive pressure in mask but less than the sum of the desired pressure and an exhalation pressure.

The primary valve 142 is generally rigid and configured to move upward or downward as a unit (in contrast to a valve flap configured to bend at an edge). The primary valve 142 includes a body 147 having an opening 148. The opening 148 of the primary valve body 147 fits around the opening 123 of the central passageway 122 of the valve carrier body 120, so that air may bypass the primary valve 142 through the opening 148 and into the opening 123 of the central passageway 122 of the valve carrier body 120. Thus, exhaled air flowing through the first pathway 106 (see FIG. 1) goes around the primary valve body 147 and through the opening 148, so that exhaled air flowing along the first pathway 106 does not encounter the primary valve body 147, allowing for lower effort exhalation (but risk of leakage during positive pressure). However, exhaled air flowing through the second pathway 108 (see FIG. 2) encounters the primary valve body 147, and thus must overcome the valve spring 146 to help prevent leakage of supplied air during positive pressure operation.

The secondary valve 150 is disposed proximate the outlet end 104, and is configured to allow passage of exhaled air out of the outlet end 104 while preventing the entry of air from the atmosphere. The secondary valve 150 may be comprised of a flexible, resilient material such as silicone rubber. The illustrated secondary valve 150 includes an outer edge 152 configured to seat against the secondary valve support in the absence of an exhalation flow, and to bias upward (toward the outlet end 104) in the presence of an exhalation flow to allow exit of exhaled air from the exhale valve assembly 100. Any air attempting to enter the exhale valve assembly 100 via the outlet end 104 will encounter the secondary valve 150, thereby urging the secondary valve 150 against the secondary valve support 119, such that the air from the environment is prevented or inhibited from passage through the secondary valve 150 toward the inlet end 102. The secondary valve 150 is configured to allow exhaled air to exit and to prevent or inhibit entry of air from the atmosphere in both positive pressure and negative pressure modes of operation. Both the first pathway 106 and second pathway 108 may be considered as leading to or through the secondary valve 150 (e.g., air passing from either the central passageway 122 or the external passageway 131 of the valve carrier body 120 toward the outlet end 104 encounters and passes through the secondary valve 150). The depicted secondary valve 150 also includes a button recess 156 sized and configured to accept a portion of the plunger 160 when the plunger 160 is in the second position 103, and to allow a user to urge the plunger 160 downward. For example, when the plunger 160 is in the second position 103, a user may insert a forger or tool into the outlet end 104 of the exhale valve assembly and against the outside of the button recess 156, urging the button recess 156 downward (e.g., toward the inlet end 102) against the plunger 160 to urge the plunger 160 downward.

In the illustrated embodiment, the plunger 160 (see FIG. 5) is configured to be movable between the first position 101 (FIG. 1) and the second position 103 (FIG. 2). The depicted plunger 160 is a generally cylindrical shaped member and at least partially hollow. In the illustrated embodiment, the plunger 160 is configured to be slidingly accepted by the plunger guide 124 of the valve carrier body 120 and the plunger 167 of the housing seat 114. For example, the plunger 160 may have an outer diameter slightly less than an inner diameter of the plunger guide 124, to allow for sliding movement while still maintaining the plunger guide 124 along a desired path during the sliding movement. The plunger 160 is configured to slidingly accept the saddle 176, so that the saddle 176 is permitted to move in the pressure actuation direction 192 relative to the plunger 160 to release the latch 130.

The depicted plunger 160 includes a body 162, a blocking plate 164, a spring opening 166, a latch opening 168, a saddle slot 165, and a button extension 163. The blocking plate 164 is a generally circular member extending radially outward from the body 162. The blocking plate 164 is sized to cover the opening 123 of the central passageway 122 of the valve carrier body 120. The blocking plate 164 is positioned along the length of the plunger 160 such that the blocking plate 164 covers the opening 123 and prevents or inhibits flow into the central passageway 122 via the opening 123 when the plunger is in the second position 103. The spring opening 166 extends from the bottom (e.g. portion proximate the outlet end 104) of the plunger 160 into the interior of the plunger 160, and accepts the plunger spring 180. The spring opening 166 may include a shoulder against which the plunger spring 180 may exert force.

The latch opening 168 is sized and positioned to accept a portion of the latch 130 when the plunger 160 is in the first position 101, and positioned such that the blocking plate 164 is disposed a distance from the opening 123 of the valve carrier body 120 when the plunger is in the first position 101. The saddle slot 165 is sized and configured to accept and slidingly secure the saddle 176 to the plunger 160, such that the saddle 176 may move in the pressure actuation direction 192 relative to the plunger 160 to be urged against a latch or other member positioned in the latch opening 168. The button extension 163 extends from the body 162 into the button recess 156 of the secondary valve 150 when the plunger 160 is in the second position 103, allowing a user to urge the plunger 160 from the second position 103 to the first position 101 by pressing against the button recess 156 of the secondary valve 150.

Figure 5:
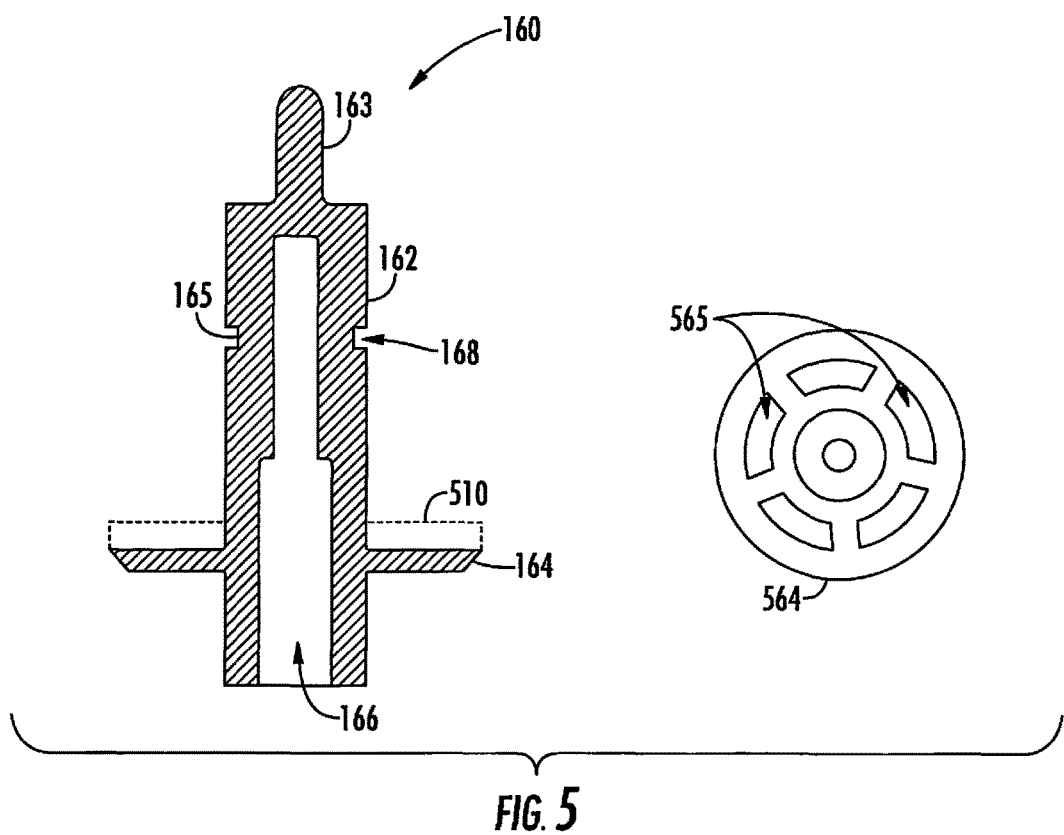
FIG. 5 is a side sectional view of a plunger formed in accordance with various embodiments.

In various embodiments, the blocking plate 164 may be configured to allow the passage of air. For example, as seen in FIG. 5, a blocking plate 564 may include openings 566 configured to allow the passage of air therethrough. The exhale valve assembly may then include a block plate valve 510 configured to be disposed on an upper surface of the blocking plate, as shown in dashed line on the plunger 160 of FIG. 5. The blocking plate valve 510 may be configured to allow passage of air through the blocking plate 564 when the plunger is in the first position 101, thereby allowing exhaled air to pass more directly to the central passageway 122 of the valve carrier body 120 and reducing required exhalation effort during negative pressure operation. The blocking plate valve 510 may be configured to prevent or inhibit the passage of air through the opening 566 of the blocking plate 564 when the plunger is in the second position 103, thereby preventing or inhibiting flow into the central passageway 122 and directing exhaled air through the primary valve assembly 140 during positive pressure operation.

The air pressure activated actuator assembly 170 is biasable or movable in the pressure actuation direction 192 responsive to a change in air pressure in the cavity 116, and operably connected to the lock assembly 132 to release the plunger 160 when the air pressure activated actuator assembly 170 is actuated and the plunger 160 is in the first position 101. The air pressure activated actuator assembly 170 may be sized and configured to release the plunger 160 form the lock assembly 132 when a pressure signal corresponding to a sharp, strong, or deep inhalation from a user is provided. The air pressure activated actuator assembly 170 may be actuated by a pressure change or signal corresponding to a pressure change or signal used to actuate an air supply via a demand valve of a SCBA (e.g., via a "first breath" arrangement). Thus, the air pressure activated actuator assembly 170 may be actuated automatically when a SCBA supply is initiated or activated. Thus, the exhale valve assembly 100 may be switch to a positive pressure mode automatically or incidentally responsive to the switch of an inhale or air supply system to a positive pressure mode. The air pressure activated actuator assembly 170 may be understood as pressure activated, negative pressure activated, or breath activated.

As mentioned above, the air pressure activated actuator assembly 170 includes a diaphragm 172, an activation pin 174, and a saddle 176. In the illustrated embodiment, under a sufficient negative pressure or drop in pressure, a portion of the diaphragm 172 (e.g., a central portion not held by the diaphragm holder 113) is drawn in the pressure actuation direction 192 toward the interior of the cavity 116, thereby urging the activation pin 174 against the saddle 176, and thereby urging the saddle 176 against the latch 130.

The diaphragm 172 may be configured as a disc shaped flexible member comprised of a flexibly resilient material such as silicone rubber. The diaphragm 172 is an example of pressure sensitive device (e.g., a device biasable via a change in air pressure). The diaphragm 172 in various embodiments may have a metal insert positioned to contact the activation pin 174. The depicted activation pin 174 includes a diaphragm contact surface 175 and a saddle contact surface 177. The saddle contact surface 177 is configured with a generally "T" shaped profile, and is sized to maintain contact with the saddle 176 when the saddle 176 travels with the plunger 160 upward to the second position 103, helping to maintain the contact and positioning of the components of the air pressure activated actuator assembly 170. The saddle 176 is movably (e.g., in the pressure actuation direction 192) mounted to the plunger 180.

It may be noted that, in various embodiments, the air pressure activated actuator assembly 170 may be configured to release the lock assembly 132 at a design pressure corresponding to a demand pressure required to activate an air supply system configured to be operably connected to the mask. Thus the lock assembly 132 may be released and the plunger 160 moved (e.g., by the plunger spring 180) from the first position 101 to the second position 103 via a shared breath activation activity configured to activate the air supply system. In some embodiments, an SCBA demand valve may include an air pressure activated actuator assembly configured substantially similarly to the air pressure activated actuator assembly 170 of the exhale valve assembly 100.

The plunger spring 180 is sized, positioned, and configured to urge the plunger 160 from the first position 101 to the second position 103. The plunger spring 180 is an example of a resilient member sized and configured to the plunger 160 along the actuation direction 190. The plunger spring 180 in various embodiments may be formed with the plunger 160 or as a separate piece 160. In the illustrated embodiment, the plunger spring 180 is a separate unit accepted by the spring opening 166 of the plunger 160.

It may be noted that while the illustrated embodiment provides automatic (e.g., incidental to demand valve activation and/or without additional operator intervention) switching to positive pressure operation, hands-free switching to positive pressure operation, and/or contact-free switching to positive pressure operation, various embodiments may provide for a manual override or backup.

Figure 6:
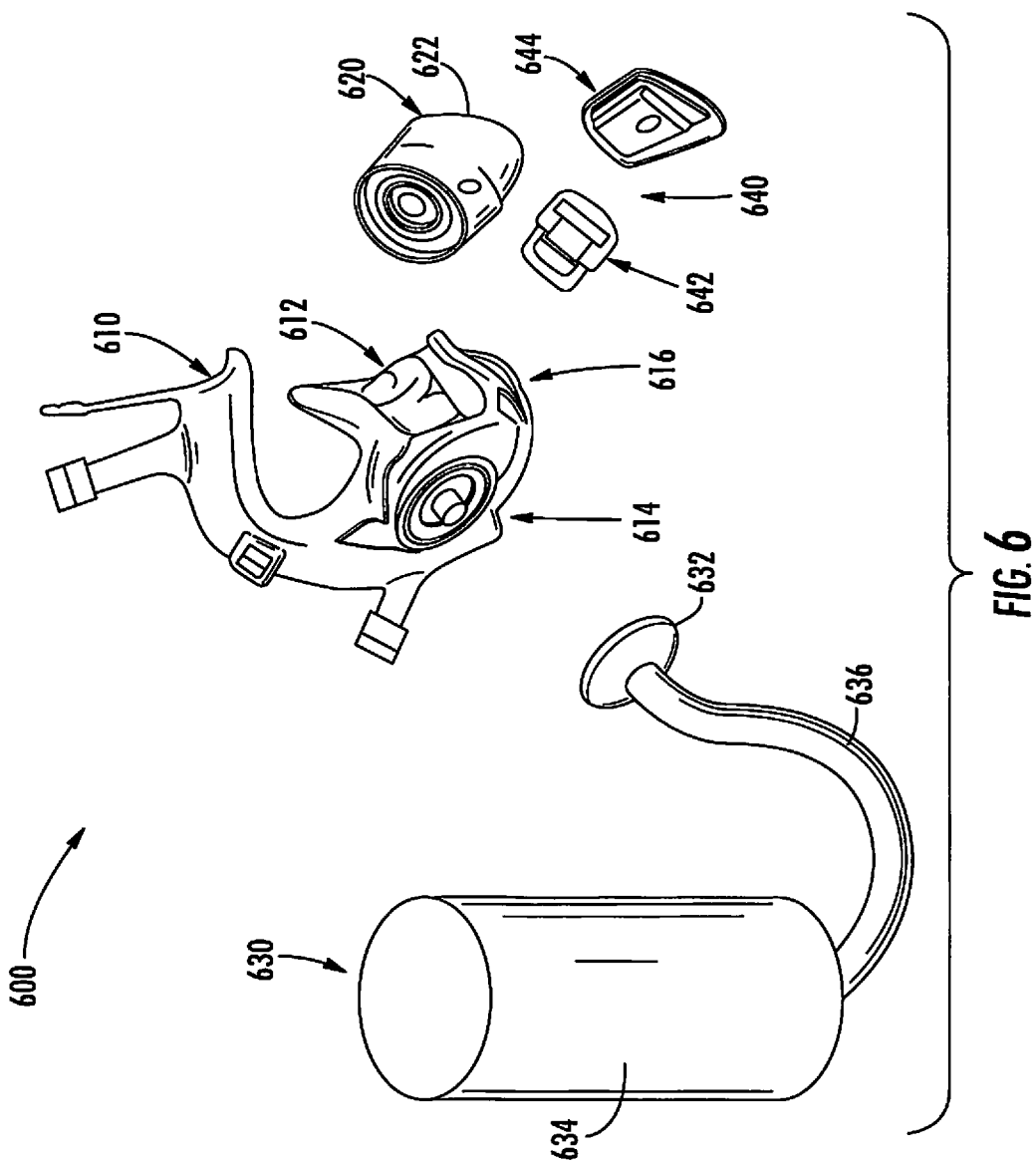
FIG. 6 is a perspective view of a respirator system formed in accordance with various embodiments.

FIG. 6 provides a perspective view of a respirator system 600 formed in accordance with various embodiments. The respirator system 600 includes a mask 610, a first air supply 620, a second air supply 630, and an exhale assembly 640. The respirator system 600 is configured for multi-mode operation (e.g., operation in either positive or negative pressure modes without requiring a change of respirator).

The mask 610 includes first inlet port 612, second inlet port 614, and exhale port 616. The inlet ports 612, 614 are configured to operably connect the mask 610 to the first air supply 620 and second air supply 630, respectively, to provide for the supply of air to the mask 610 for inhalation by a user or wearer of the mask 610. The use of two inlet ports allows for switching between air supply system without interruption or with a very short interruption in supply, and to allow for switching between air supplies without requiring connecting or disconnecting an air supply from an inlet port.

An air supply system as used herein may be understood as a system or group of components configured for the provision of air for breathing to a mask, face piece, or the like worn or utilized by an operator or user. Examples of air supply systems include APR or other filter canister systems, PAPR systems, or SCBA systems, among others. An air supply system may actively provide air, for example via a fan or pressurized device that delivers air into the mask. Other air supply systems may passively provide air, for example via air drawn in from the atmosphere through a filter by the unaided breathing of a wearer of the mask. Various air supply systems may be configured for positive pressure operation, wherein a positive pressure is maintained inside the confines of a mask, hood, or the like worn by a user. Other air supply systems may be configured for negative pressure operation, where a positive pressure is not maintained inside the mask and air is drawn from the outside by the unaided breathing of a user.

For example, the first air supply 620 may be configured as an APR system, and include a canister filter 622 configured for connection to the first inlet port 612. Air from the atmosphere may be drawn through the canister filter 622 by a user's breath. The depicted first air supply 620 is configured for negative pressure operation (e.g., with the plunger 160 in the first position 101, and with the exhale valve assembly 100 in the first configuration (FIG. 1)).

The second air supply 630 may be configured as a SCBA system, and include a demand valve 632 joined to a supply tank 634 via a conduit 636. The demand valve 632 may include a "first breath" mechanism, for example an air pressure activated actuator system as discussed herein, configured to actuate supply from the supply tank 634 (e.g., operation of the mask 610 in a positive pressure mode) responsive to an inhalation signal from a user or wearer of the mask 610 (e.g., a sharp, strong, or deep breath providing a desired or design pressure change or drop). The depicted second air supply 630 is configured for positive pressure operation (e.g., with the plunger 160 in the second position 103, and with the exhale valve assembly 100 in the second configuration (FIG. 2)).

The depicted exhale assembly 640 is configured to be operably connected with the mask 610 via the exhale port 616. The exhale assembly 640 of the illustrated embodiment includes an exhale valve assembly 642 and a cover 644. The exhale valve assembly 642 may be configured substantially similar in respects to the exhale valve assembly 100 described herein. The exhale valve assembly 642 may be configured to switch from negative pressure operation to positive pressure operation at a design pressure corresponding to the pressure required to activate the second air supply system 630 (e.g., at the same pressure, within a range of pressures corresponding to the pressure required to activate the second air supply system, or at a pressure range related to the pressure required to activate the second air supply system adjusted by a predetermined conversion factor).

Thus, a user or wearer of the mask 610 may switch between negative pressure operation and positive pressure operation for both the air supply and exhale system or assembly of the respirator system 600. In the illustrated embodiment, the switch from negative pressure operation to positive pressure operation for both inhalation and exhalation may be achieved by a predetermined breath activity. Thus in various embodiments, a demand valve for an air supply system may be provided having a demand pressure activated actuator assembly configured to activate use of the supply tank responsive to an inhalation signal from a user (e.g., at a demand pressure). Further, an exhale valve assembly operably connected to the same mask as the demand valve may include an air pressure activated actuator assembly configured to release a lock assembly and switch the exhale valve from negative to positive pressure operation at a design pressure corresponding to the demand pressure of the demand valve, with both the exhale valve assembly and the demand valve triggered responsive to the same breath activity or inhalation signal. Thus, the user or wearer of the mask 610 need not remember to manually actuate the exhale valve assembly from negative pressure operation to positive pressure operation, as the exhale valve assembly will have switched responsive to the same signal or pressure change causing the supply to switch to positive pressure operation.

Thus, various embodiments provide a switchable exhale valve assembly allowing for convenient switching between various modes of operation. Various embodiments provide for reduction in the ingress of air or potential contaminants into a mask during switching of modes or types of operation. Various embodiments provide improved convenience and reliability in the switching and operation of exhale configurations for respirator systems. Various embodiments provide automatic (e.g., without requiring an additional specifically targeted act by a user or operator) switching from a negative pressure mode of operation to a positive pressure mode of operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described herein without departing from its scope. While the dimensions and types of materials described herein are intended to define the parameters of the subject matter described herein, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the subject matter described herein, and also to enable any person skilled in the art to practice the embodiments of the subject matter described herein, including making and using any devices or systems and performing any incorporated methods. The patentable scope of the subject matter described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An exhale valve assembly configured to be operably connected to a mask and having an inlet end configured to accept exhaled air and an outlet end configured for egress of accepted exhaled air from the exhale valve assembly, the exhale valve assembly comprising:
   a housing having a cavity disposed therein, a length, and a central axis passing along the length;
   a valve carrier body disposed in the cavity and having a passageway extending along a length of the valve carrier body;
   a primary valve including a body and an opening, the primary valve mounted to the valve carrier body with the opening disposed circumferentially around the valve carrier body, wherein a first air flow path passes through the passageway of the valve carrier body and a second air flow path passes through the body of the primary valve;
   a plunger disposed at least partially within the valve carrier body and movable between a first position and a second position, the plunger comprising a blocking plate configured to permit the exhaled air through the first air flow path when the plunger is in the first position and to direct the exhaled air through the second air flow path when the plunger is in the second position;
   a lock assembly operably connected to the plunger and configured to secure the plunger in the first position; and
   an air pressure activated actuator assembly disposed within the cavity and comprising a pressure sensitive member biased in a pressure actuation direction when a pressure in the cavity changes, the pressure actuation direction being a direction that is transverse to the central axis of the housing, the air pressure activated actuator assembly operably connected to the lock assembly and configured to release the lock assembly when the pressure within the cavity of the housing changes.

2. An exhale valve assembly of claim 1, further comprising a secondary valve disposed in the cavity proximate the outlet end, the secondary valve configured to inhibit the entry of air from a surrounding atmosphere via the outlet end.

3. An exhale valve assembly of claim 2, wherein the pressure actuation direction is substantially transverse to a direction traveled by the plunger between the first and second positions.

4. An exhale valve assembly having an inlet end configured to accept exhaled air and an outlet end configured for egress of accepted exhaled air from the exhale valve assembly, the exhale valve assembly comprising:
   a housing having a cavity disposed therein, a length, and a central axis passing along the length;
   a valve carrier body disposed in the cavity and having a central passageway extending along a length of the valve carrier body, the central passageway having an opening proximate the inlet end;
   a primary valve assembly comprising a primary valve having a body and a central opening, the primary valve mounted to the valve carrier body proximate the opening of the central passageway, the central opening of the primary valve disposed circumferentially around the valve carrier body, wherein a first air flow path passes through the central passageway of the valve carrier body and a second air flow path passes through the primary valve assembly;
   a secondary valve disposed in the cavity proximate the outlet end, the secondary valve configured to inhibit the entry of air from a surrounding atmosphere via the outlet end;
   a plunger disposed at least partially within the valve carrier body and movable between a first position and a second position along an actuation direction oriented along a length of the housing, the plunger comprising a blocking plate, wherein the blocking plate is positioned a distance away from the opening of the central passageway of the valve carrier body when the plunger is in the first position and wherein the blocking plate is positioned covering the opening of the central passageway of the valve carrier body when the plunger is in the second position, wherein the exhaled air is inhibited from entering the central passageway and is directed through the second air flow path when the plunger is in the second position;

a lock assembly operably connected to the plunger and configured to secure the plunger in the first position; and an air pressure activated actuator assembly disposed within the cavity and comprising a pressure sensitive member that is biased in a pressure actuation direction when a pressure in the cavity changes, the pressure actuation direction being a direction that is transverse to the central axis of the housing, the air pressure activated actuator assembly operably connected to the lock assembly and configured to release the lock assembly when the pressure within the cavity of the housing changes.

5. An exhale valve assembly according to claim 4, further comprising a plunger spring disposed within the cavity and operably connected to the plunger, the plunger spring configured to urge the plunger toward the second position, wherein the plunger is actuated to the second position when the lock assembly is released.

6. An exhale valve assembly according to claim 5, wherein the pressure sensitive member comprises a diaphragm, the lock assembly comprises a latch, and the air pressure activated actuator assembly comprises an activation pin and a saddle, the activation pin operably connected to the diaphragm and movable in the pressure actuation direction responsive to a movement of the diaphragm, the saddle mounted to the plunger and movable therewith, the saddle operably connected to the activation pin, wherein the saddle is configured to be urged against the latch to release the lock assembly when the plunger is in the first position and the diaphragm is biased in the pressure actuation direction.

7. An exhale valve assembly according to claim 6, wherein the air pressure activated actuator assembly is configured to release the lock assembly at a design pressure corresponding to a demand pressure required to activate an air supply system configured to be operably connected to the mask.

8. An exhale valve assembly according to claim 7, further comprising a button disposed in the cavity proximate the outlet end, movement of the button toward the inlet end urging the plunger from the second position to the first position.

9. An exhale valve assembly according to claim 8, wherein the primary valve is maintained in a same spatial relationship with respect to the housing when the plunger is in the first position and when the plunger is in the second position.

10. An exhale valve assembly of claim 9, wherein the pressure actuation direction is substantially transverse to the actuation direction along which the plunger is movable.

11. A respirator assembly comprising:
a mask comprising first and second inhale ports and an exhale port, the first and second inhale ports configured to accept an air supply from first and second air supply systems, respectively, the exhale port configured for passage of exhaled air from the mask; and
exhale valve assembly operably connected to the mask via the exhale port, the exhale valve assembly having an inlet end configured to accept the exhaled air and an outlet end configured for egress of the exhaled air from the exhale valve assembly, the exhale valve assembly comprising:
a housing having a cavity disposed therein, a length, and a central axis passing along the length;
a valve carrier body disposed in the cavity and having a passageway extending along a length of the valve carrier body;
a primary valve assembly including a primary valve having a body and an opening, the primary valve mounted to the valve carrier body with the opening disposed circumferentially around the valve carrier body, wherein a first air flow path passes through the passageway of the valve carrier body and a second air flow path passes through the primary valve assembly;
a plunger disposed at least partially within the valve carrier body and movable between a first position and a second position, the plunger comprising a blocking plate configured to permit the exhaled air through the first air flow path when the plunger is in the first position and to direct the exhaled air through the second air flow path when the plunger is in the second position;
a lock assembly operably connected to the plunger and configured to secure the plunger in the first position; and
an air pressure activated actuator assembly disposed within the cavity and comprising a pressure sensitive member that is biased in a pressure actuation direction when a pressure in the cavity changes, the pressure actuation direction being a direction that is transverse to the central axis of the housing, the air pressure activated actuator assembly operably connected to the lock assembly and configured to release the lock assembly when the pressure within the cavity of the housing changes.

12. A respirator assembly of claim 11, further comprising a demand valve operably securable to at least one of the first and second inhale ports, the demand valve configured to control a flow of air for inhalation from a supply tank to the mask, the demand valve comprising a demand pressure activated actuator assembly configured to activate use of the supply tank responsive to an inhalation signal from a user, wherein the air pressure activated actuator assembly is configured to release the lock assembly at a design pressure corresponding to a demand pressure required to activate the use of the supply tank via the demand valve, wherein the plunger is configured to be movable from the first position to the second position responsive to the inhalation signal.

13. A respirator assembly of claim 12, further comprising a plunger spring disposed within the cavity and operably connected to the plunger, the plunger spring configured to urge the plunger toward the second position, wherein the plunger is actuated to the second position when the lock assembly is released.

14. A respirator assembly of claim 13, wherein the pressure sensitive member comprises a diaphragm, the lock assembly comprises a latch, and the air pressure activated actuator assembly comprises an activation pin and a saddle, the activation pin operably connected to the diaphragm and movable in the pressure actuation direction responsive to a movement of the diaphragm, the saddle mounted to the plunger and movable therewith, the saddle operably connected to the activation pin, wherein the saddle is configured to be urged against the latch to release the lock assembly when the plunger is in the first position and the diaphragm is biased in the pressure actuation direction.

15. A respirator assembly of claim 14, wherein the primary valve is maintained in a same spatial relationship with respect to the housing when the plunger is in the first position and when the plunger is in the second position.

* * * * *